Jan. 19, 1965 G. H. BROWNE ETAL 3,165,808
WARPER
Filed May 2, 1961 12 Sheets-Sheet 1

INVENTORS.
Godfrey H. Browne, Woodrow W. Cloer,
George Manning, John A. McCoig, Sr.,
& Thomas F. Suggs,
BY Paul & Paul
ATTORNEYS.

Jan. 19, 1965    G. H. BROWNE ETAL    3,165,808
WARPER

Filed May 2, 1961    12 Sheets-Sheet 6

FIG. 6

INVENTORS.
Godfrey H. Browne, Woodrow W. Cloer,
George Manning, John A. McCoig, Sr.
& Thomas F. Suggs, BY Paul & Paul
ATTORNEYS.

INVENTORS.
Godfrey H. Browne, Woodrow W. Cloer,
George Manning, John A. McCoig, Sr.,
& Thomas F. Suggs,
BY Paul & Paul
ATTORNEYS.

3,165,808
WARPER
Godfrey H. Browne, Woodrow W. Cloer, George Manning, John A. McCoig, Sr., and Thomas Frank Suggs, all of Gastonia, N.C., assignors to Cocker Machine & Foundry Company, Gastonia, N.C., a corporation of North Carolina
Filed May 2, 1961, Ser. No. 107,159
7 Claims. (Cl. 28—32)

This invenition relates to a warper, for example to an apparatus for winding warp yarns and the like, drawn from individual supply packages, onto beams which subsequently may be transferred to looms for weaving of cloth, for example. This invention constitutes an improvement over the apparatus disclosed in U.S. Patent 2,680,-896 granted to Cocker Machine & Foundry Company of Gastonia, North Carolina, as assignee of H. W. Groce et al., on June 15, 1954. In this patented apparatus which enjoyed very substantial success, various sequential settings and adjustments were made manually by an attendant in preparation for power installation of an empty beam, and also in preparation for doffing of the full beam.

It is an object of this invenition to provide an automatic means for carrying both these operations into effect, since they are time-consuming and require skill in their accomplishment.

Another object of this invention is to provide a means whereby loading and doffing of the beams are effected by automatic means under manual control.

Other objects and advantages of this invention will further appear hereinafter, and in the drawings, wherein.

As herein exemplified, the warper of our invention has a base 1 with two main laterally spaced frames 2, 2a rising from said base, said side frames respectively having, at opposite ends thereof, upstanding brackets 3, 4 and 3a, 4a between which respectively, longitudinally extending parallel guide rods 5 and 5a are rigidly supported. Beyond the brackets 4, 4a the guide rods 5, 5a are connected by a transverse channel bar 6 which is rigidly supported from the base 1 by a pair of inclined struts 7. Slidable along rods 5, 5a are carriages 8, 8a respectively having inwardly reaching bracket extensions 9, 9a wherein are secured the opposite ends of a shaft 10 upon which a press roll 11 is rotatively supported. The carriages 8, 8a are joined by a cross bar 12 whereto, at the center, is connected the piston rod 13 of a horizontally arranged double-acting hydraulic cylinder 15, the latter being pivotally connected at its rear end to the bar 6 by a bolt 16. Respectively affixed to and extending rearwardly from the carriages 8, 8a are toothed racks 17, 17a that mesh with spur pinions 18, 18a on a cross shaft 19 whereof opposite ends are rotatively supported in bearings 20, 20a on the brackets 4, 4a of frames 2, 2a. During operation of the warper, the press roll 11 is urged forwardly by the piston rod of the cylinder 15 so as to be held yieldingly in engagement with the warps W as they are wound upon the beam generally designated 14. It will be observed that the racks and pinions 17, 17a and 18, 18a cooperate to maintain the press roll 11 positively in true parallelism with the beam 14 during the winding.

Figure 2:
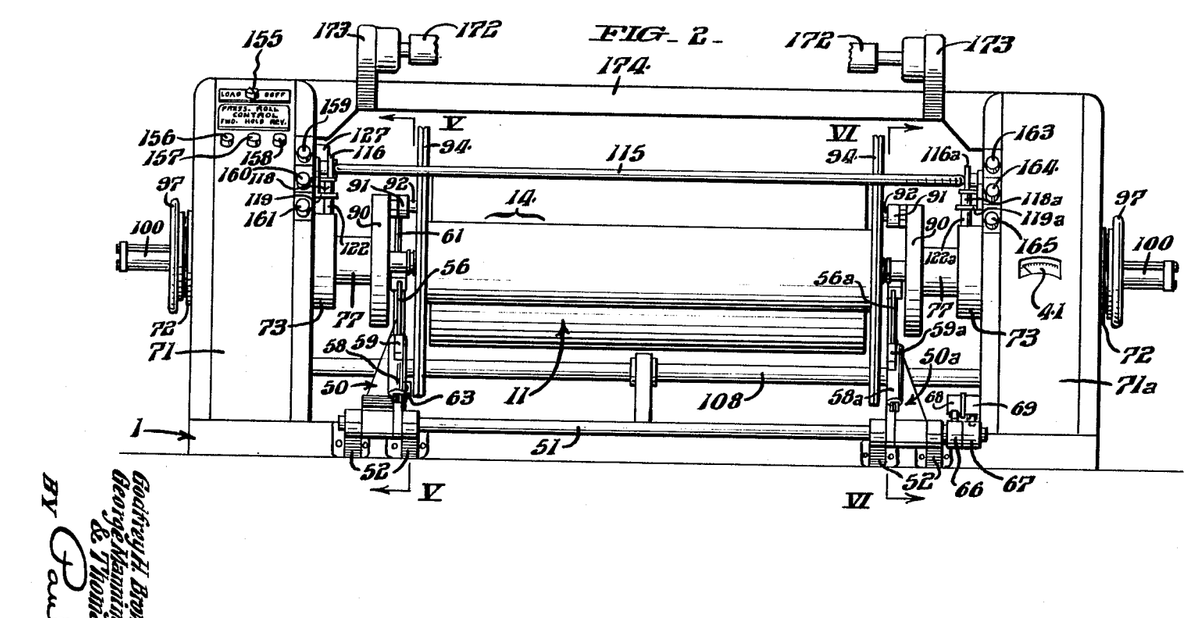
FIG. 2 is an end elevation as seen when viewed from the left of FIG. 1.
Figure 3:
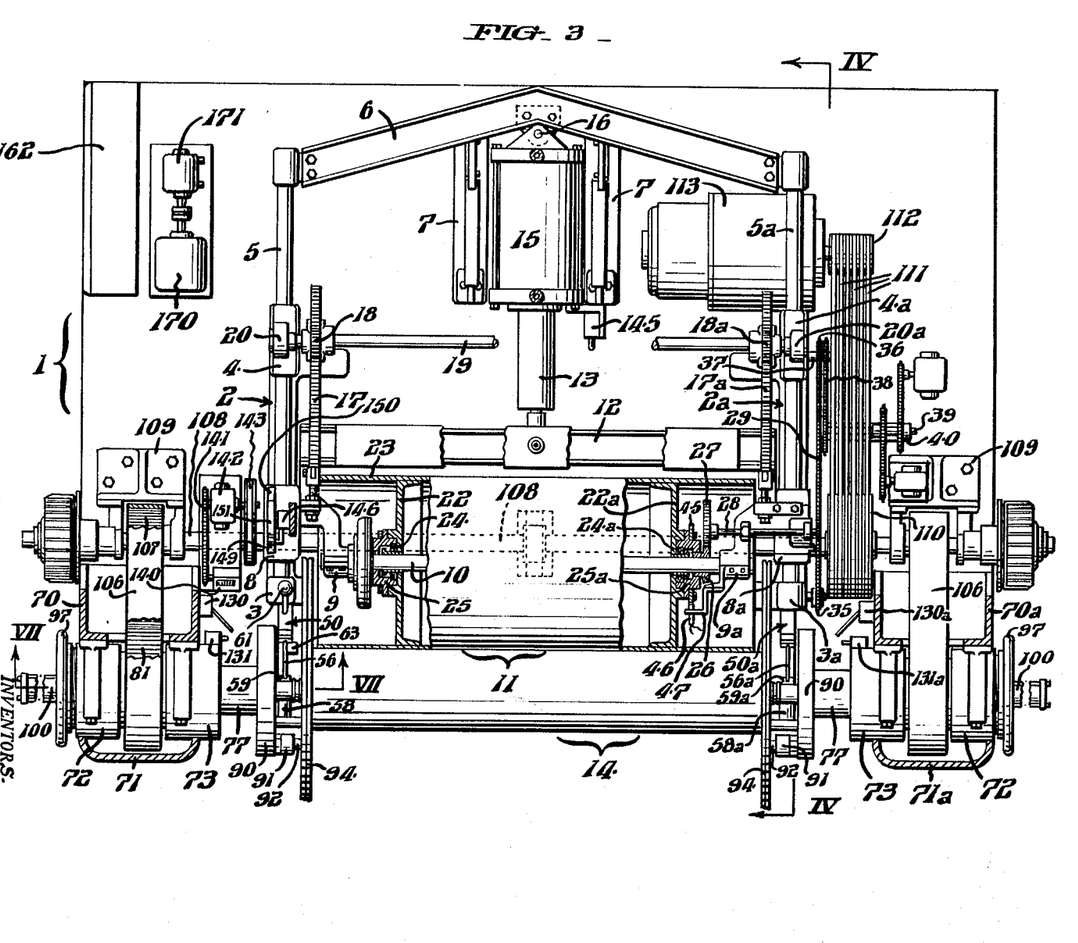
FIG. 3 shows the warper in top plan with portions broken out and in section taken on the horizontal plane III—III in FIG. 1.

As best shown in FIG. 3, the heads 22, 22a of the press roll 11 are recessed inwardly from the ends of the shell 23 of said roll and have hubs which are hollowed out for reception of ball bearings 24, 24a which are held in place by closure collars 25, 25a. Accordingly, the press roll is mounted to rotate freely about the shaft 10. Affixed to the collar 25a so as to turn with the press roll is a spur pinion 26 which meshes with the spur gear 27 at the inner end of the countershaft 28 rotatively borne on the carriage 9a at the corresponding side of the warper. An endless chain 29 engaged about a sprocket pinion 30 on the outer end of shaft 28 is directed downwardly to a pair of idlers 31 and 32 (FIG. 1) which are rotatively free on studs 33 and 34 projecting laterally from carriage 8a. After underpassing the idlers 31 and 32, the chain 29 is diverted horizontally in opposite directions to pass about sprocket wheels 35 and 36 whereof the former is free on a stud on bracket 3a and the latter is secured to a shaft 37 journaled on the side frame 2a. By another chain 38 a sprocket on shaft 37 is connected, in accordance with the present invention, to a sprocket on a shaft 39 borne in a bracket 40 on base 1. Also affixed to the closure collar 25a is a toothed ring 45 for actuating an electrical pick-up 46 sustained by a bracket 47 on bracket 9a, and connected to the tachometer indicator 41 which appears in FIG. 2.

Figure 4:
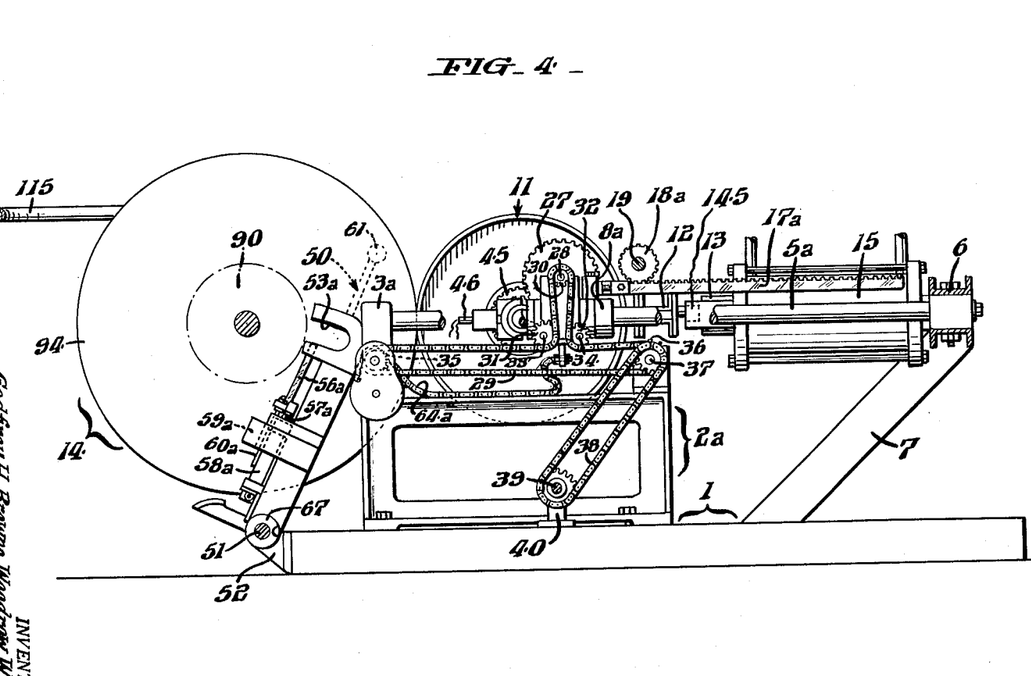
FIG. 4 is a longitudinal section of the warper taken as indicated by the angled arrows IV—IV in FIG. 3.

For mounting an empty beam in the warper and in doffing it after it has been wound with the warps, use is made of a pair of arms 50, 50a which are keyed to a rock shaft 51 rotatably engaged in fixed bearings 52 at the front end of base 1, the distal ends of said arms being notched as 53, 53a for engagement with the corresponding ends of the beam shaft. During the swing of arms 50, 50a the corresponding ends of the beam shaft are held within the notches 53, 53a by slide latches 56, 56a which, in accordance with the present invention, are connected to the piston rods 57, 57a of pressure fluid cylinder 58, 58a bolted respectively to said arm. Also affixed to the arms are normally open electric switches 59, 59a by which the supply and exhaust of pressure fluid to the cylinders 58, 58a is controlled as later on explained, said switches being operable by rods 60, 60a pendent from the latches. The arms 50, 50a are swingable manually by means of a grasp handle 61 projecting upward from the distal end of one of them. Normally when their use is not required the arms 50, 50a occupy a retracted position, as instanced in FIGS. 1, 5 and 6, and when so positioned, the arm 50 holds open an electric plunger limit switch 63 which is affixed to the rear end of the side frame 2. By means of chains 64, 64a the arms 50, 50a are connected respectively to the slide carriages 8 and 8a. Normally when the arms 50, 50a are retracted in idle position the chains 64, 64a are slacked as instanced in FIG. 4. Fast on rock shaft 51 outward of bearings 52 is a pair of cams 66 and 67 having circumferential notches to act respectively upon the plungers of electric switches 68 and 69.

Figure 6:
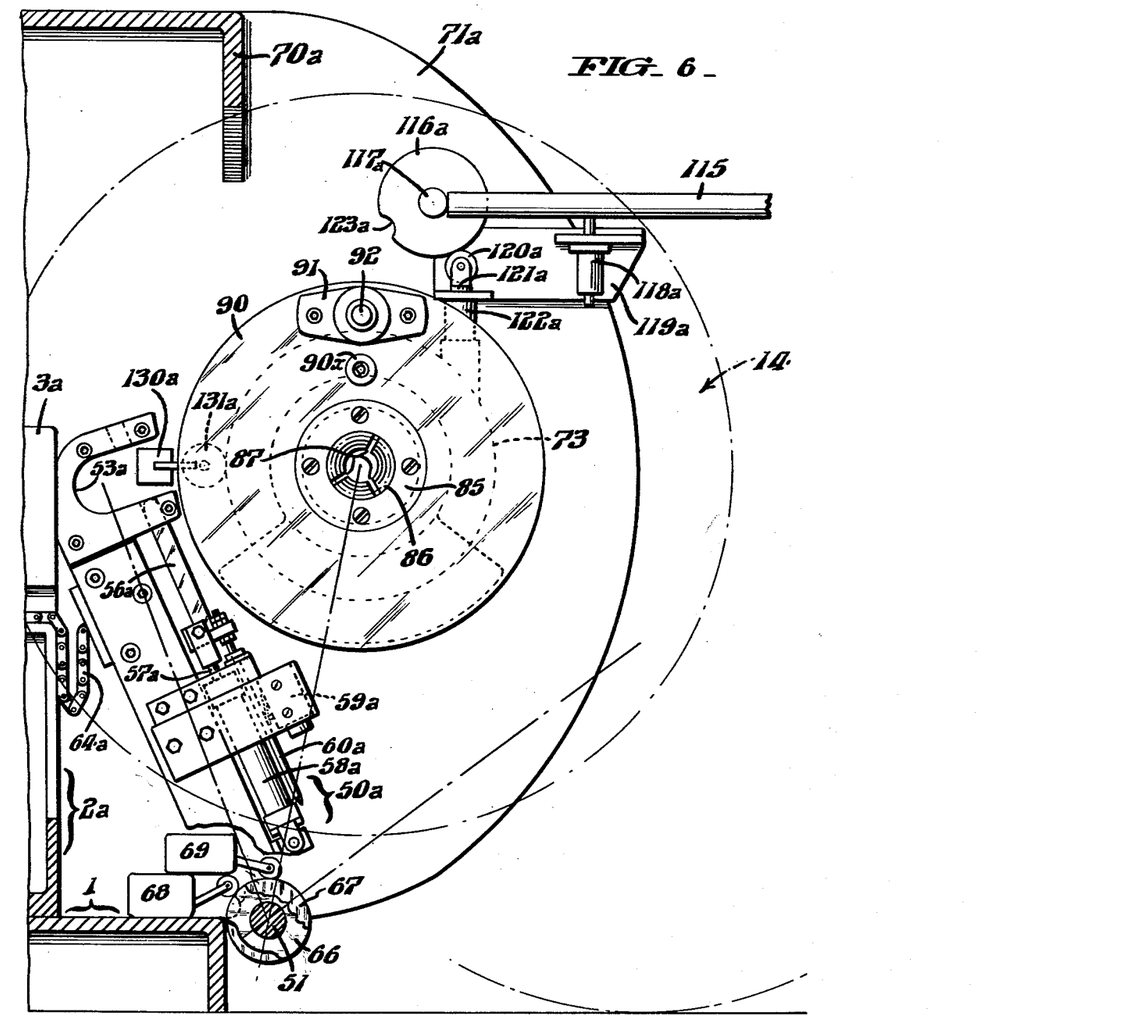

Cam 66 normally keeps switch 68 closed when the doff heads 50 and 50a are pushed back against the frame of the warper. When the doff heads 50 and 50a are manually brought away from the frame and in engagement with the journal ends of the beam shaft when the beam is fully loaded, the notch on cam 66 lets switch 68 (which is a doff arm positive switch) open the circuit to the main drive. When the beam with the doff heads 50 and 50a reach and rest on the floor, switch 66 comes out of engagement with the notch on cam 66 and the switch is closed, which closes the circuit to energize the latch valve solenoid 216 retracting the latches 56 and 56a, all as seen in FIG. 6.

Cam 67 normally keeps switch 69 open when the doff heads 50 and 50a are pushed back against the frame of the warper. When the doff heads 50 and 50a are around the journal ends of an empty beam which is resting on the floor, the notch on cam 67 closes switch 69 which is a beam-loading position-switch which prevents starting of the load cycle, until doffing heads 50 and 50a are in position around beam end journals, all as seen in FIG. 6.

Figure 1:
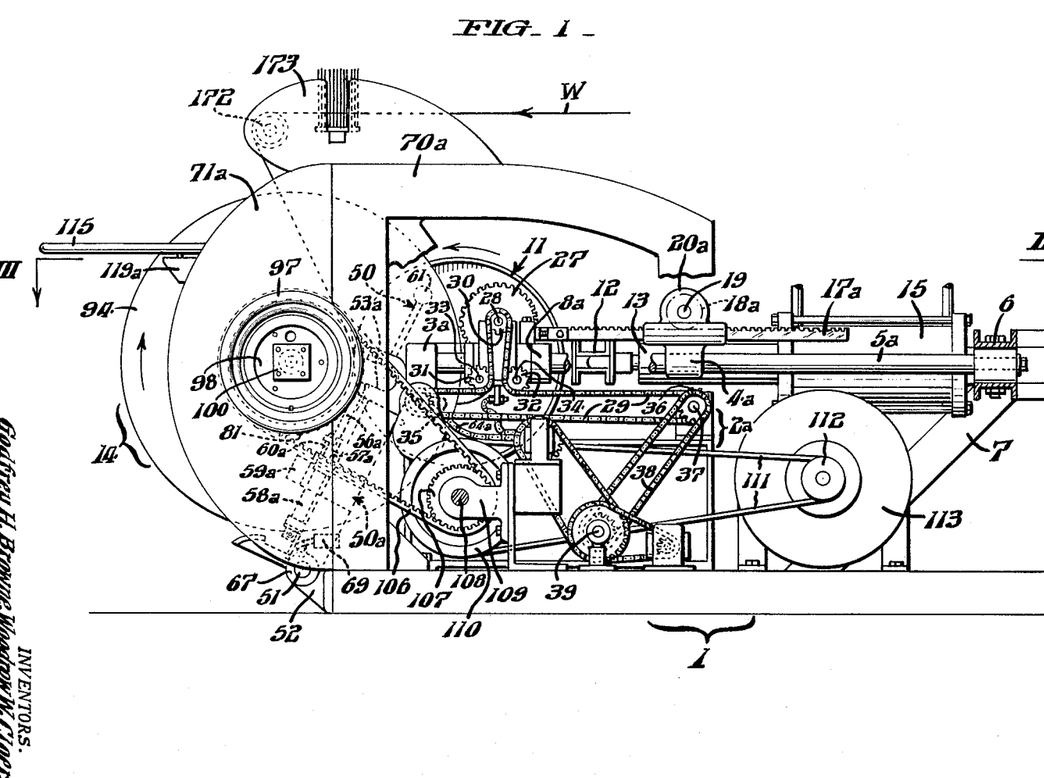
FIG. 1 is a view in side elevation of a beam warper incorporating features according to this invention.

Mounted on the front end portion of base 1 respectively outward of the frames 2 and 2a are supplemental side frames 70, 70a whereto are secured housings 71, 71a which as seen in FIG. 1, are substantially semicircular in configuration; and positioned in each of these housings is a pair of spaced boxes 72 and 73. Rotatively supported in each pair of the boxes 72 and 73 by means of ball bearings 74 is a sleeve which surrounds a short endwise slidable shaft 77. A key 78 passes through a slot 79 in sleeve 76 and into a key way 80 in the shaft 77 and also serves to connect a pulley 81 arranged between the boxes 72 and 73 to both the said sleeve and shaft. Fitting within a bore 82 at the outer end of the shaft 77 is a sleeve 83 which is yieldingly urged outwardly by a spring 84 with its outer end contacting a stop disc 85 secured to the outer end of shaft 77, and which contains a smaller endwise slidable sleeve or collet 86 whereof the entrant end portion is longitudinally split as at 87. Another spring 88 normally urges the collet 86 yieldingly outward with the end thereof contacting the stop disc 85 and with a conical head of said collet disengaged from the surface of the coned entrant end of the bore in the sleeve 83 as in FIG. 8. Keyed to the protruding end of shaft 77 is a circular flange 90 having an eccentrically disposed boss 91 wherein an axially shiftable spring-backed pin 92 is adapted to engage into a similarly disposed hole 93 in the corresponding head flange 94 of the beam 14. An eccentrically disposed stop in 90x on the flange 90 engages the head flange of the beam 14 when the spindle 77 is projected as in FIG. 7. Screw engaged into the outer end of the block 72 is the hub of a hand wheel 97, and fixedly peripherally engaged in an internal groove of said hub is a circular plate 98 whereto is affixed, by tie bolts 99, a double acting pressure fluid cylinder 100. As shown, to the outer end of the piston rod 101 of the cylinder 100 is connected a head 102 which is retained within a bore 103 in the proximate end of the shaft 77 by a ring nut 104 and is engaged with a thrust ball bearing 105. A cap ring 72x fixed in the outer end of the block 72 has a projecting stud 72y engaged through an eccentrically disposed hole in the disc 98 to prevent the plate from rotating with the spindle 77. By turning the hand wheel 97 in one direction or the other it is possible to shift the spindle 77 axially, within the sleeve 76 as may be necessary to compensate for beams which vary slightly in length. It will be understood that the hand wheels 97 are ordinarily adjusted prior to the operation of the machine and that, once the machine is ready for operation, both spindles are fixed and are constructed to resist side thrusts from the beam, but do not push against the beam. By means of belts 106 the pulleys of 81 are drive-connected to pulleys 107 respectively on a countershaft 108 which extends crosswise of the apparatus and is rotatively sustained in bearings 109 upstanding from base 1. Fast on shaft 108 at the righthand side of the apparatus as considered in FIGS. 1 and 3 is a grooved pulley 110 which, through a plurality of V-belts 111, is connected to a smaller pulley 112 on the shaft of an electric driving motor 113 mounted on the base 1 adjacent the rear end thereof.

Figure 5:
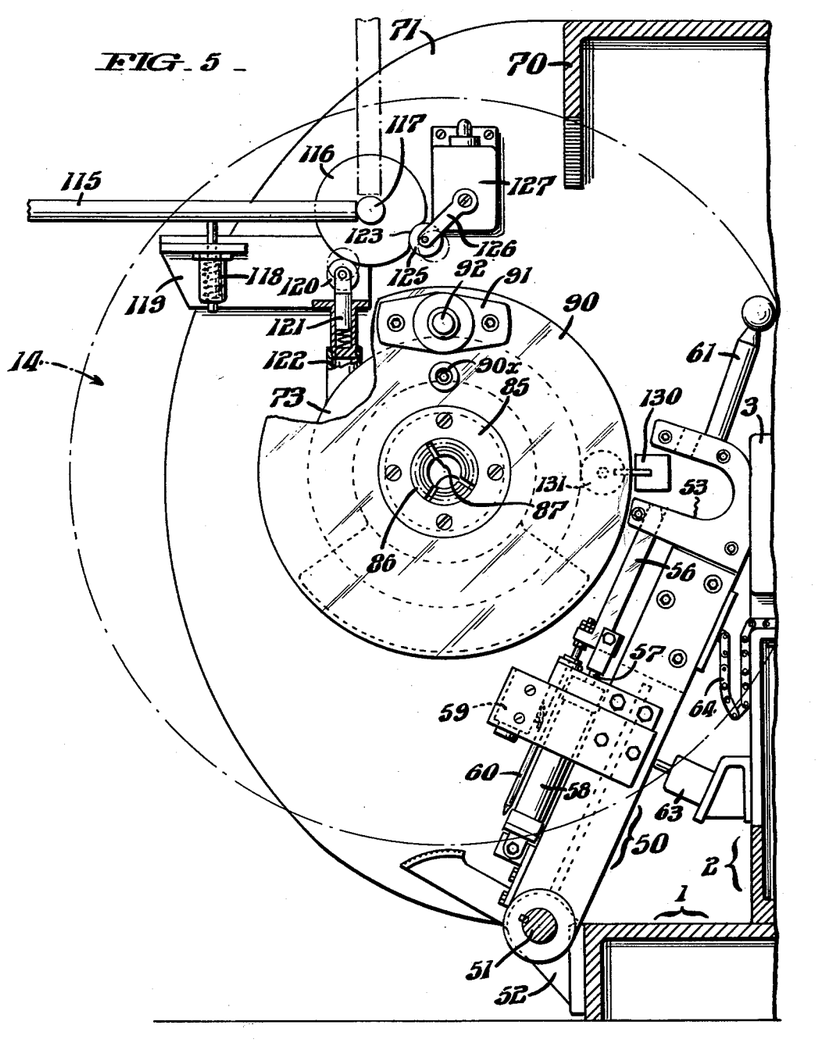
FIGS. 5 and 6 are fragmentary views in section taken as indicated respectively by the angled arrows V—V and VI—VI in FIG. 2 and drawn to a larger scale.

A manually swingable transversely arranged bale-like member 115 (FIGS. 1, 2, 5 and 6) has affixed to its side arm discs 116, 116a having studs 117, 117a engaged into the inner faces respectively of the housings 71, 71a. Bale like member 115 is used as a safety device to keep the operator away from the running beam. If the operator wishes to inspect or otherwise move close to the beam, he will lift member 115 which automatically opens safety switch 127 which opens the main drive circuit of the beam, thereby preventing the beam from running while the operator is positioned close to the beam, all as seen in FIGS. 5 and 6. Normally the member 115 occupies the horizontal position in which it is shown in full lines in FIGS. 5 and 6 with its side arms resting respectively upon spring-backed stops 118, 118a on brackets 119, 119a at the inner faces of the housings. When the member 115 is swung up to the broken line upright position in FIG. 5 it will be so held by engagement of rollers 120, 120a on spring pressed plungers 121, 121a of holding means 122, 122a in circumferential notches 123, 123a in the discs 116, 116a. When the member 115 is horizontally positioned as in FIG. 5 the notch 123 in one of the discs 116 is occupied by a roller 125 on the actuating arm 126 of a safety switch 127 affixed to the inner face of the housing 71 to permit said switch to close normally. Also secured respectively to the inner faces of the housings 70, 70a and the boxes 73 are normally closed switches 130, 130a and 131, 131a which are opened upon engagement of their actuating members by the disk flanges 90 on the slide shafts 77 when said shafts are retracted as instanced in FIG. 8 to release the beam 14.

The yardage of the warps wound upon the beam is registered by a counter indicated at 140 in FIG. 3, said counter being operated through a sprocket chain connection 141 with a speed reducer 142 driven a belt connection 143 from the countershaft 108.

Operation

In beaming, the beam 14 is constantly driven to draw the warp W from individual supply packages in a conventional creel (not illustrated). Enroute to the beam the warp yarns are directed over a guide roll 172 (FIGS. 1 and 2) which is journaled in bearings 173 on a bar 174 bridged between the frames 70 and 70a. All the while, the press roll 11 is maintained in pressure engagement with the warp windings collecting on the beam 14, by action of pressure fluid admitted into the rear end of cylinder 15. After the desired yardage has accumulated on the beam 14, an attendant, by pressing either the button 161 or button 165, brings the warper to a standstill and then manually moves the doffing arms 50, 50a forwardly from the normal retracted position of FIGS. 1 and 4 to engage the notches of said arms over the journals of the beam 14. When in this new position, it will be observed that the arms 50, 50a are forwardly inclined relative to the vertical plane through the axis of the rock shaft 51.

Figure 11:
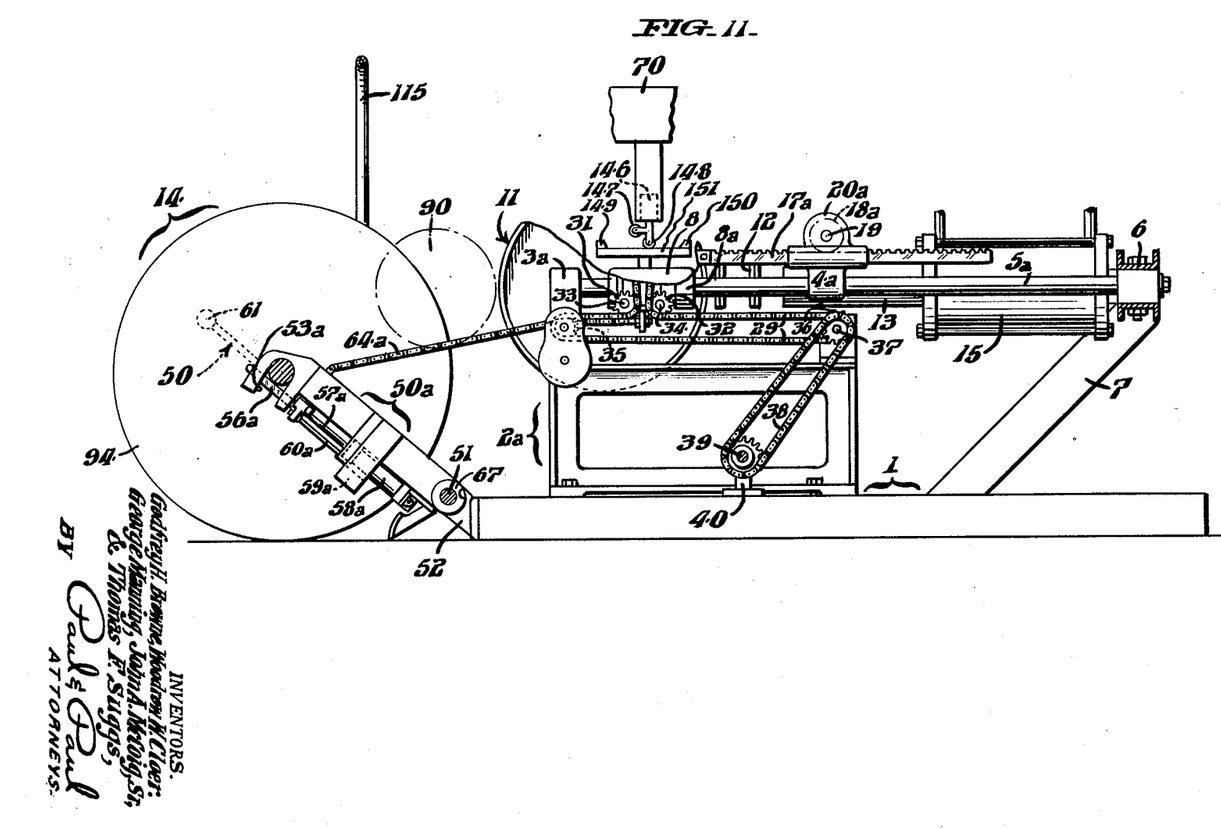
FIG. 11 is a view corresponding to FIG. 4 with a beam in readiness to be mounted in the apparatus.

A limit switch 145 affixed to the rear end of cylinder 15 has an actuating plunger which is adapted to be engaged by the cross bar 12 connecting the carriages 8, 8a as said carriages are retracted. Another switch 146 supported in suspension from the auxiliary frame 70 (FIG. 11) has an actuating member with rollers 147, 148 adapted to be engaged alternately by cam projections 149, 150 of a plate 151 mounted on carriage 8. For control of the warper, we have also provided on the housing 71 as shown in FIG. 2, a selector switch 155, a forward button 156, a hold button 157, a reverse button 158, a jog button 159, start button 160 and stop button 161 and on the housing 71a a jog button 163, start button 164 and stop button 165. The jog buttons are used if the warper is in a stopped condition at any point. If the operator wishes to move the warper forward just a little intermittently he will use jog button 159. If the operator wishes to move the warper in reverse just a little intermittently he will use the jog button 163. In a control box 162 shown in FIG. 3, there are included a line switch 200 for the power lines 201, 202 and 203, which supply power to the drive motor 113, a step down transformer 206, a doff relay 207, load relay 208, forward relay 209, reverse relay 210, press roll solenoid valve 211 with forward and reverse control coils 212 and 213, doff valve solenoid 216, spindle valve solenoid 217 and control relays 218, 219, 220 and 221, all shown in FIG. 13. The functions of these switches and electrical components and also the various switches mentioned hereinbefore will be described later.

Mounted on the base 1 adjacent the rear end is a pump 171 and a driving motor 170 therefor said pump providing the pressure fluid for the press roll cylinder 15, the latch actuating cylinders 58, 58a, and the spindle actuating cylinders 100 after the manner presently explained.

The sequence of operations of the apparatus in accordance with this invention is as follows:

Doffing sequence

It is to be assumed that the doffing arms 50, 50a are pushed back against the frame of the warper. This closes safety switch 63, and as will be seen from FIG. 13, this energizes electric wire line 230. The doffing arms 50, 50a are manually laid back by the operator of the machine in order to accomplish this. Next, the operator presses reverse button 158 and the presser roll 11 is moved backwards. The reverse relay 210 is energized when the operator pushes the reverse button 158. The hydraulic cylinder 15 (see FIGS. 1 and 4) moves the pressor roll 11 all the way back, causing relay 210 (FIG. 13) to be energized and relay 210 holds. Limit switch 145, which is located at the end of the rearward motion of the presser roll 11, closes, and its contact b opens the circuit 231, 232. At this stage, limit switch 146 is opened and its contact b breaks the circuits 233 and 234, while switch 68 is closed across the circuits 233 and 234. This causes the latch valve 216 (see FIGS. 12 and 13) to be energized, retracting the latches 56, 56a. This opens the notches 53, 53a of the arms 50, 50a.

Figure 7:
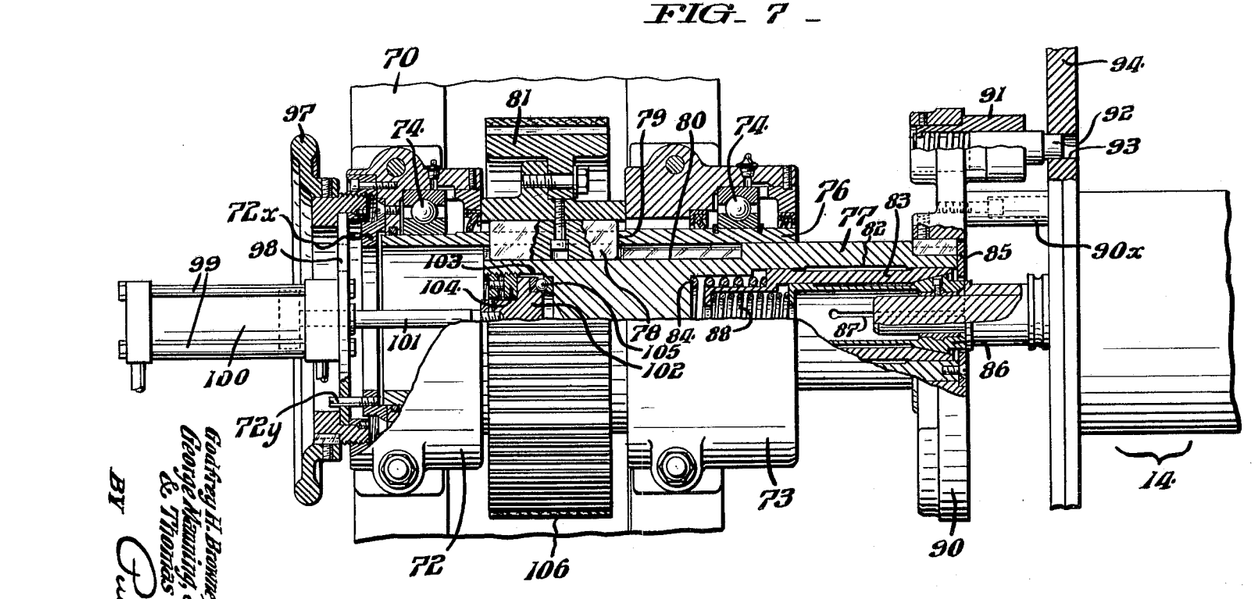
FIG. 7 is a fragmentary view in section taken as indicated by the angled arrows VII—VII in FIG. 3 showing how the beam is supported in the apparatus.

The load relay 208 which is normally open and switch 145, together with the circuits 233 and 234 which they control, keep such circuits de-energized in view of the fact that the contacts are broken and thus the spindles 77 stay out (in a position toward one another) under the influence of the springs 88, as shown in FIG. 7, thus remaining in a position for holding the beam 14.

The next operation is the manual movement by the operator of the machine, of selector switch 155, to the "doff" position. The operator then manually moves the doffing arms 50, 50a toward himself, away from the frame of the machine. This movement of arms 50, 50a opens switch 63, thus shutting off the current in line 230 and relay 210 is de-energized. Line 235 is energized, energizing relays 207 and 221 through the closed contact a of switch 145 and through the selector switch 155. Contact a at relay 207, which is normally open, becomes closed across the circuit to 233, thus keeping the latches 56, 56a open.

Figure 9:
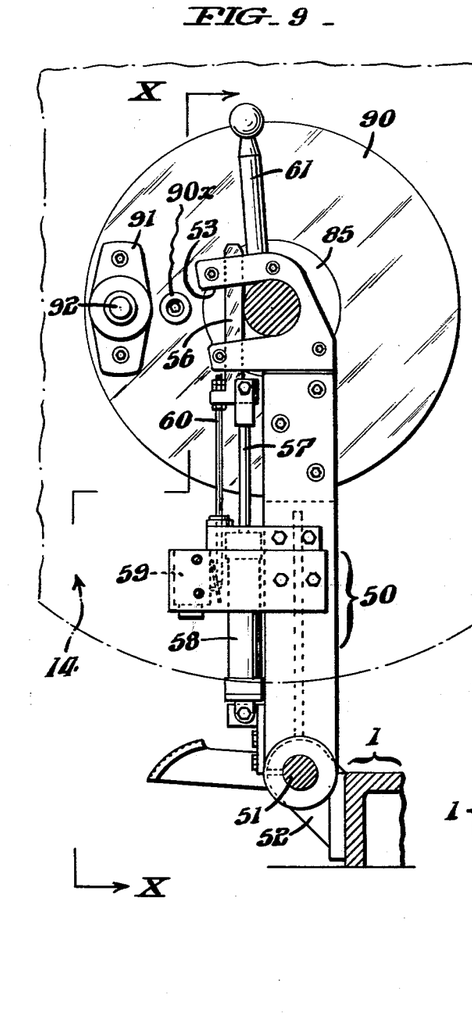
FIG. 9 is a view corresponding to FIG. 5 with the parts definitely positioned.
Figure 10:
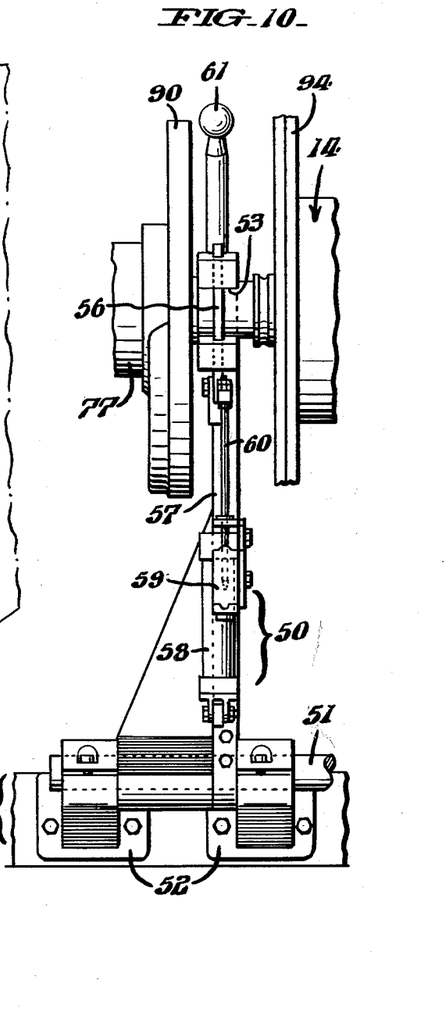
FIG. 10 is a fragmentary view looking as indicated by the angled arrows X—X in FIG. 9.

The doffing heads 50, 50a are then positioned with notches 53, 53a in engagement with the journal ends of the beam shaft. Switch 68 opens (contact b of switch 146 are already open), and this closes the latches 56, 56a. Latch switches 59 and 59a close under the influence of the rods 60, 60a (see FIGS. 5, 6 and 9), which rods reciprocate along with the latches 56, 56a. Thus the action of rods 60, 60a cause the opening and closing of the switches 59, 59a. This closes the circuits 236, 237, 238, 239, 240 and 241 together with the forward solenoid 212. Through the closed contact a of switch 146 the presser roll 11 is thus moved forward. Its movement continues forward with the beam moving to the floor under control of chains 64, 64a. When the beam reaches the floor or other supporting surface, the switch 68 closes in response to the mechanical swinging movement of the arms 50 and 50a. The closing of this switch energizes the latch valve solenoid 216, retracting the latches 56, 56a. With the retraction of the latches 56, 56a, switches 59 and 59a open, opening circuits 236 and 242.

With the movement of the presser roll, yoke switch 146 is actuated and the contact b closes the circuit through 233 and 234, thus holding the latch valve 216 energized so that the latches 56, 56a stay retracted. The presser roll moves back when the reverse button 158 is pressed. The same is true for the forward movement when the forward button 156 is pressed. This also opens the contact a of switch 146 from circuits 239 and 240 and this stops the presser roll. The presser roll is so constructed that it may be moved back through a limited distance without permitting the latches 56, 56a to close.

Loading Sequence

The doffing arms 50, 50a are positioned around the journals of an empty beam, closing switch 69. The selector switch 155 is switched to the load position thus relay 207 is de-energized, opening circuit 233 by opening contact a of relay 207. Relay 208 is energized. Thus the circuit through 208, 236, 59, 243, 59a, 242 closed contact d of relay 207, 244 and closed contact c of forward button 156 to presser roll reverse solenoid coil 213 of valve 211; this then moves the presser roll in reverse. Relay 221 stays energized. The spindles 77 remain retracted through circuits 231 and 232. The spindles 77 move out when the press roll opens limit switch 145. The latches retract when the limit switches 130 and 130a open in response to the outward movement of the spindles 77. The operator manually moves the doffing heads back to the frame of the machine. This opens switch 69 and switch 68 is closed. The operator's movement of moving the doffing arms back to the H frame automatically closes the doff safety switch 63.

Figure 8:
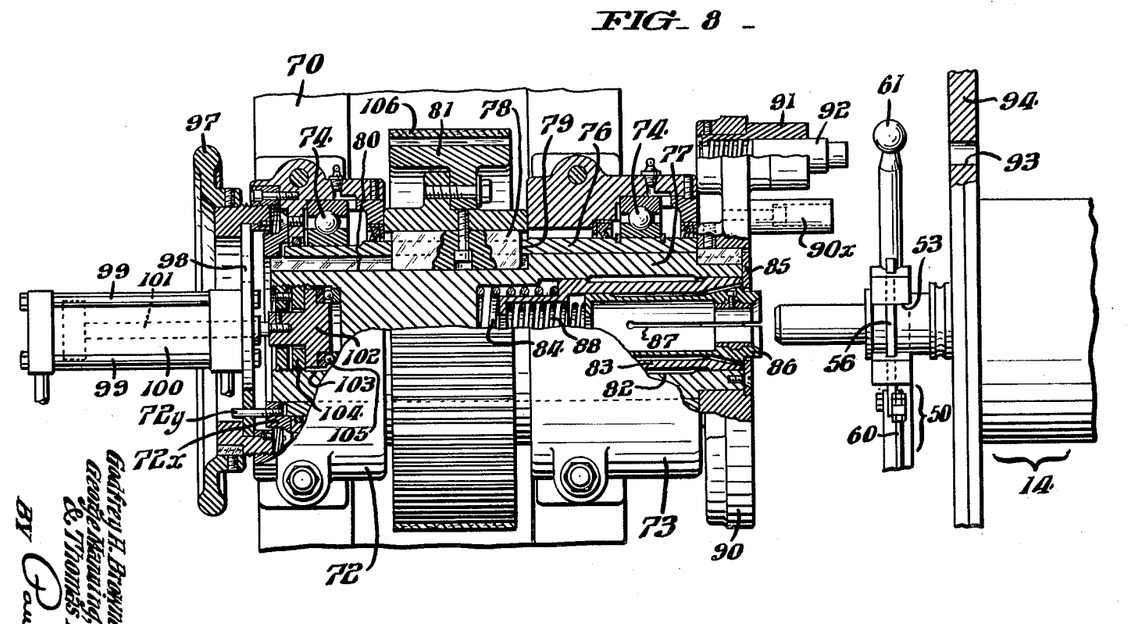
FIG. 8 is a view similar to FIG. 7 showing how the beam is disconnected from the drive means provided therefor in the apparatus.

It will be apparent, accordingly, that the members 83 and 86 exert a clamping action on the shaft of the beam as follows. Member 83 which is a sleeve with a coned entrant end in its bore is normally spring-urged outwardly between the inner end of bore 82 of shaft 77 against the stop disc member 85 fixed on the outer end of shaft 77. Member 86 is a slideable sleeve or collet with an end split as at 87 and with a conical head on its outer end which is normally spring-urged outwardly against the stop 85 by the spring 88. Member 86 fits in the bore of member 83 with its conical head normally disengaged from the coned entrant end of member 83 when shaft 77 is in its retracted position so being held by the double acting cylinder 100, as seen in FIG. 8.

When the journal shaft of beam 14 is brought into alignment with shaft 77 and double acting cylinder 100 is moved forward to engage shaft 77 with journal shaft of beam 14, the split end 87 of member 86 first engages over the journal shaft as urged by spring 88. At the same time member 83 is urged by spring 84 outwards with its coned entrant end in engagement with the conical head of member 86. Since the ring on the journal shaft prevents the member 86 from coming fully against stop 85, the member 83 being urged outwardly by spring 84, its coned entrant end being against conical head of member 86, a clamping action takes place with the member 83, coned entrant end forcing the conical head of member 86 due to the split end 87 of same against the shaft, thereby clamping 77 to beam shaft 14, as seen in FIG. 7.

Figure 12:
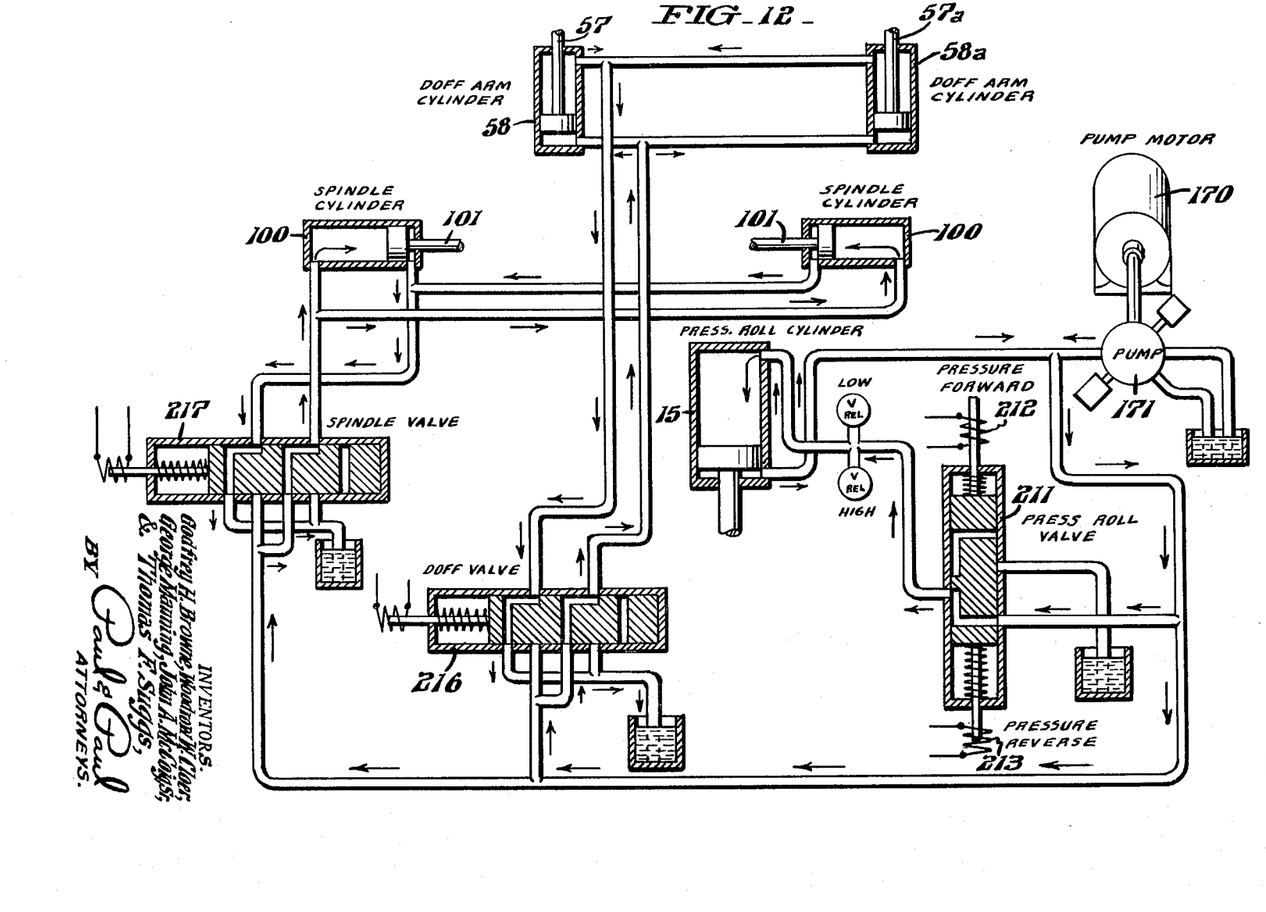
FIG. 12 is a diagrammatic view showing various hydraulic devices used in the apparatus.
Figure 13:
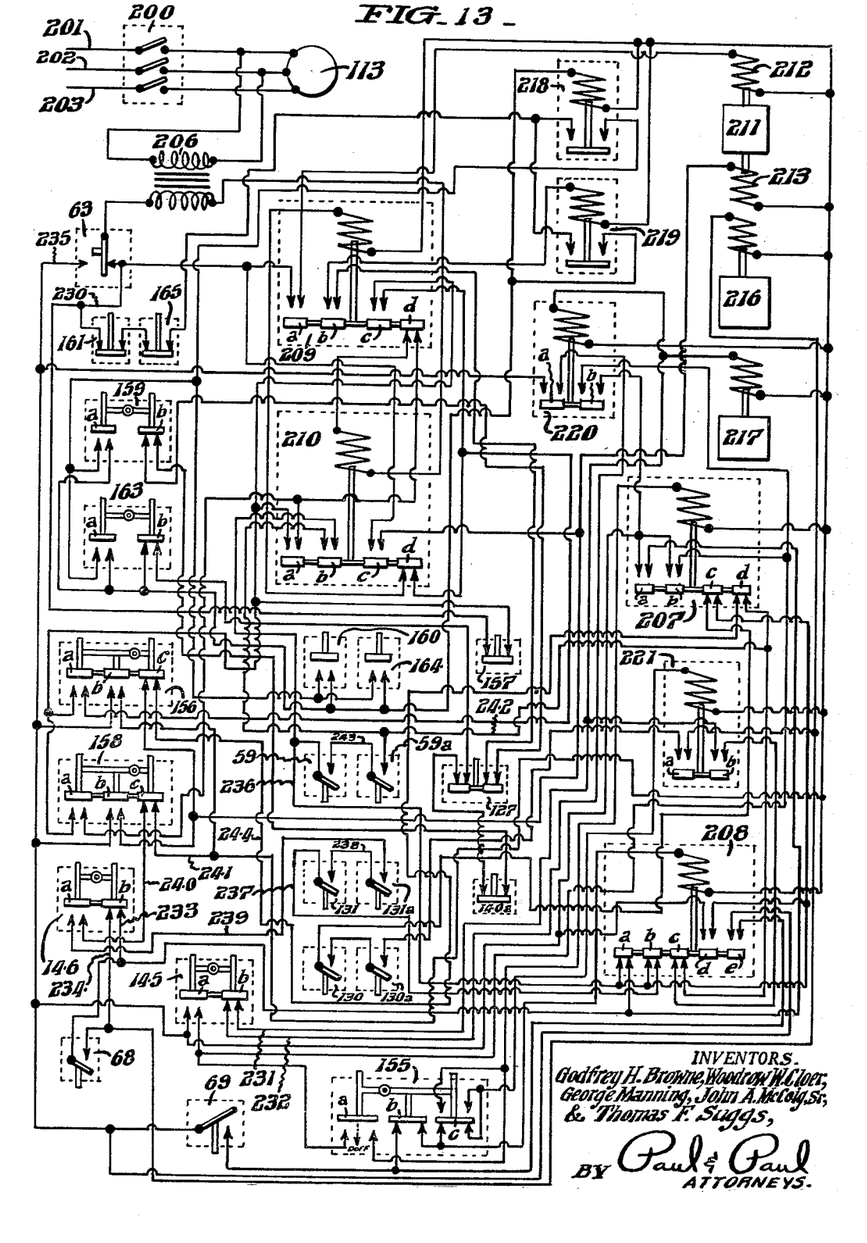
FIG. 13 is a wiring diagram of various electrical appurtenances embodied in the apparatus.

Shafts 77 are actuated from one position to the other by the double acting cylinders 100, which are actuated through the spindle valve 217 on FIGS. 12 and 13 and the limit switch 145, and control relays 220 and 221 as shown on FIG. 13.

Although this invention has been described with reference to one embodiment thereof, it will be apparent to those skilled in the art that various changes other than those referred to above may be made in the form of the device, that equivalent elements may be substituted for those illustrated in the drawings, that parts may be reversed, and that certain features of the invention may be used to advantage independently of the use of other features, all within the spirit of the invention as defined in the appended claims.

We claim:

1. In a beam warper, drive means by which the beam is rotated at an elevation in the warper above floor level; and doffing means including a pair of normally retracted manually moveable notched arms for engaging the beam journals after the beam is filled, said arms having normally retracted latches for closing said notches; means automatically actuated as said arms are moved manually to engage the beam journals to stop the drive means, automatic means for thereupon actuating the latches to close the notches of the arms, then release the beam from the driving means, and thereafter control the arms to lower the beam to the floor and finally retract the latches, and manual means for restarting the automatic means for reversal of the above procedure to position a new empty beam in the warper.

2. In a beam warper, a pair of beam engaging members endwise slidable at an elevation above base level in the warper, said beam engaging members being constructed for reception of the beam journals; means for driving the beam engaging members; a press roll; a supporting carriage for the press roll; a pressure fluid means connected to the carriage for normally maintaining the press roll yieldingly engaged with the warp windings on the beam during the beaming; a pair of normally retracted arms affixed to a rock shaft below the beam engaging members, said arms having notches and normally retracted latches for closing the notches; normally slacked chains connecting said arms to the carriage; means automatically operative as the arms are swung manually to engage their notches over the journaled ends of the beam inwardly of the beam engaging members, to stop the press roll drive means, to cause exhaustion of the rear end of the carriage cylinder, and admission of pressure fluid to the front end of the cylinder for retraction of the carriage and the press roll from the beam, means automatically operated as the carriage is retracted to cause the latches to close the notches of the arms and to retract the beam engaging members for release of the beam; automatic means for thereafter exhausting the front end of the carriage cylinder and admitting pressure fluid to the rear end of the carriage cylinder to advance the carriage and gradually let down the arms until the beam is lowered to the base; and automatically operative means for causing retraction of the latches to permit release of the filled beam.

3. In a beam warper, a base, a first beam-engaging means for supporting a beam at an elevation above base level, drive means connected to rotate said beam at said elevation; and doffing mechanism including automatic means for disconnecting the beam from said first beam-engaging means and said drive means after it is filled, second beam-engaging means for lowering the beam to said base and releasing means for automatically releasing said beam from said second beam-engaging means.

4. In a beam warper, drive means by which the beam is rotated at an elevation in the warper above base level; a pair of beam-engaging members movable away from the ends of the beam for disengagement from said ends; doffing means including a pair of arms lowerable toward said base level, said arms having means engageable with said beam ends for supporting said ends prior to the disengagement of said beam-engaging members; manually started automatic means for releasing the beam, after it is filled, from the driving means and from the beam-engaging members and for controlling the arms to lower the beam to the base; and other manual means for restarting the automatic means for reversal of the above procedure to position a new empty beam in the warper.

5. In a beam warper, drive means by which the beam is rotated in the warper at an elevation above base level; a pair of beam-engaging members for supporting the beam ends and retractable so as to disengage therefrom; doffing means including a pair of arms manually engageable with the beam after it is filled; means automatically actuated as the doffing means is engaged with the filled beam to disconnect the beam-engaging members and the beam from the drive means and thereafter controlling operation of said doffing means to lower the beam to the base; and other manual means for restarting the automatic means for reversal of the above procedure to position a new empty beam in the warper.

6. A beam warper characterized as in claim 1, wherein the drive means includes a pair of beam-engaging members having recessed heads and wherein stationarily supported pressure fluid cylinders have their pistons connected to the heads to serve as means for retracting the beam-engaging members in preparation for removal of the beam after it is filled and for mounting a new empty beam in the warper.

7. A beam warper according to claim 1, wherein the drive means includes a pair of beam-engaging members surrounded respectively by sleeves rotatively set in bearings and spline connected to said sleeves; wherein adjusting hand wheels are provided respectively having hollow hubs threadedly engaged into the outer ends of the bearings; wherein discs are provided which engage into internal grooves respectively in the adjusting wheel hubs; wherein guide studs are provided which project respectively from closure rings attached to the frame of the warper into eccentrically disposed holes in the discs; wherein pressure fluid cylinders are secured to the respective discs and have their piston rods connected to heads recessed into the outer ends of the beam-engaging members for retracting said members when pressure fluid is admitted to said cylinders to release the beam after it is filled in preparation for doffing and for mounting a new empty beam in the warper.

References Cited in the file of this patent

UNITED STATES PATENTS

| | | |
|---|---|---|
| 2,356,365 | Wiggermann | Aug. 22, 1944 |
| 2,450,431 | Lambach | Oct. 5, 1948 |
| 2,487,492 | Suggs | Nov. 8, 1949 |
| 2,728,130 | Luchansky | Dec. 27, 1955 |
| 2,843,915 | Drake | July 22, 1958 |
| 2,955,897 | Noe | Oct. 11, 1960 |